Oct. 26, 1954

J. D. CUMMINGS 2,692,565

PIPE CONVEYER SYSTEM

Filed Sept. 26, 1949

INVENTOR
James D. Cummings
BY
Lester B. Clark
& Ray L. Smith
Attorneys

Oct. 26, 1954    J. D. CUMMINGS    2,692,565
PIPE CONVEYER SYSTEM
Filed Sept. 26, 1949    2 Sheets-Sheet 2

INVENTOR
James D. Cummings
BY Lester B. Clark
& Ray L. Smith
Attorneys

Patented Oct. 26, 1954

2,692,565

UNITED STATES PATENT OFFICE 2,692,565

PIPE CONVEYER SYSTEM

James D. Cummings, Houston, Tex., assignor to Crutcher-Rolfs-Cummings Company, Houston, Tex., a corporation of Texas Application September 26, 1949, Serial No. 117,775

2 Claims. (Cl. 104—236)

This invention relates to a conveyor system and more particularly to a system which is adapted to transfer a horizontally moving object from a receiving to an unloading location.

It is an object of this invention to provide a conveyor system for transferring a horizontally moving object, as a wrapped and coated pipe which has moved through a pipe protection machine, to an unloading location.

It is a further object of this invention to provide a conveyor system of this class which includes a set of dollies having clutches which are engaged manually and disengaged automatically by means within the system.

It is also an object of this invention to provide a dolly for horizontally transporting loads which is adapted to idle upon a moving chain, and which has clutch means thereon readily engaged to permit the chain to move the dolly.

Other and further objects will be apparent when the specification is considered in connection with the drawings in which.

Figure 1:
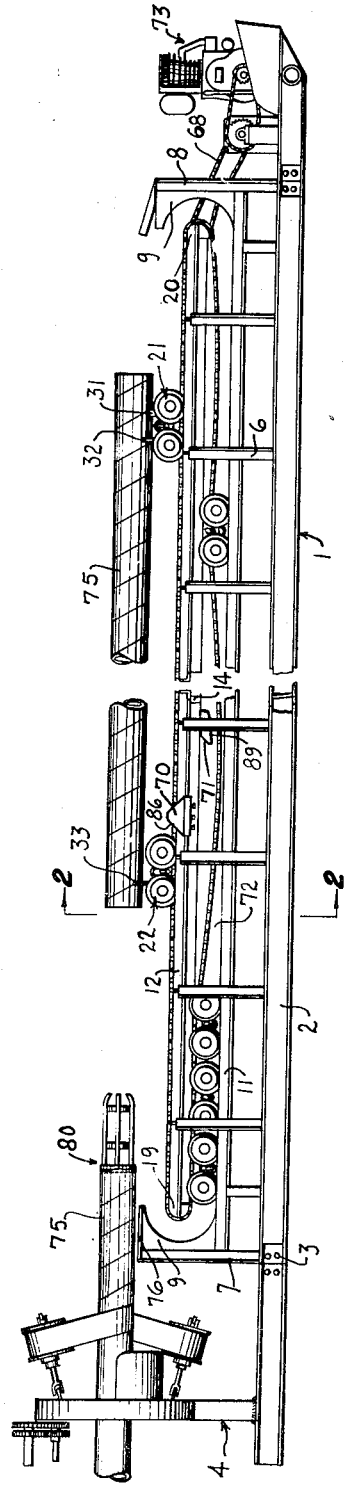
Fig. 1 is an elevation showing the system in the process of transporting pipe from a pipe protection machine.
Figure 2:
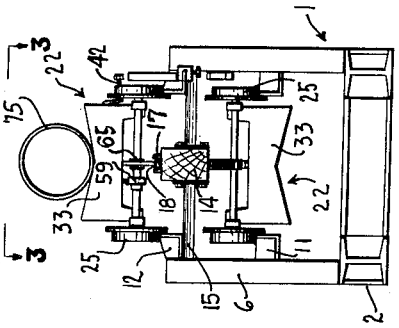
Fig. 2 is a sectional elevation taken along line 2—2 of Fig. 1, showing the dollies employed in the system.
Figure 4:
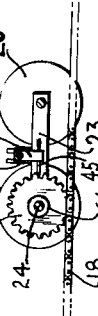
Fig. 4 is a sectional elevation taken along line 4—4 of Fig. 3.
Figure 3:
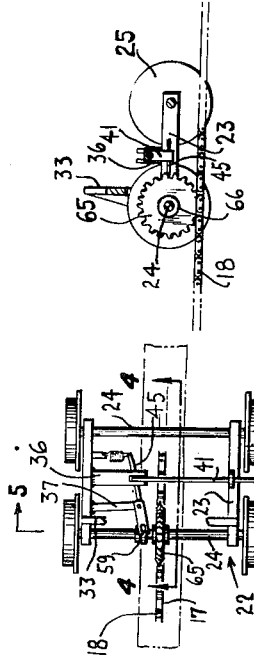
Fig. 3 is a plan view of a dolly taken along line 3—3 of Fig. 2.

The conveyor system 1 comprises a frame 2 which may have rigidly connected thereto, as by bolts 3, a pipe coating and wrapping machine 4 or any other device designed to transfer a pipe or similar object along a horizontal path. The frame 2 has spaced uprights 6 thereon and end uprights 7 and 8 which have arcuate segments 9 connected thereto. Horizontal extending tracks 11 and 12 are mounted on the uprights one above the other and a track beam 14 is mounted centrally of the upper track 12 and supported by cross pieces 15. A chain track 17 is mounted centrally of the track beam 14 to receive a chain 18 which is designed for engagement with sprockets of any conventional design.

The track beam 14 has arcuate ends 19 and 20 and the chain track 17 for receiving the endless chain 18 extends therearound and passes under the track beam. Dollies 21 and 22 are provided, each dolly comprising a frame 23 whose opposite ends are welded or rigidly connected to a pair of spaced dead axles 24, which axles have mounted thereon wheels 25 which have bearing bushings 26 therein, the wheels being free to rotate on the axles, and being held thereon by the axle caps 28. The wheels are of the flanged type and are designed to ride upon the tracks 11 and 12, which may be simply constructed of angles connected to the uprights 6 by gusset plates.

For purposes hereinafter described, each dolly 21 has a band 31 mounted on the forward end of its frame 23 and a band 32 mounted on the rear end of its frame while each dolly 22 has only one band 33 thereon which is mounted on the rear end of the dolly frame 23.

Each dolly has a bracket 35 in the shape of an inverted U mounted on one side of the frame 23 and oppositely disposed on the other side of the frame 23 it has another bracket 36 which comprises two horizontally extending bars with the flat surfaces thereof in vertical planes. On the same side of the frame as the bracket 36, another bracket 37 is mounted and spaced on the dolly to the rear of the bracket 36, and this bracket comprises two parallel extending plates 39 and 40 with the flat surfaces thereof extending in horizontal planes. A lever 41 having a handle 42 is mounted to extend through the bracket 35 with the handle outwardly thereof, and this lever 41 is pivotally mounted between bars 36 by means of a pin 43 so that the lever jaw 44 extends therebelow.

A clutch operating device 45 has a vertical post 46 turned down at the lower end, not shown, to bear on the lower plate 40 of the bracket 37; the upper end of the post 46 extending through the upper plate 39 of the bracket 37 and having the arm 48 rigidly connected thereto above its journal in the upper plate. The rod 49 is rigidly connected to the post 46 centrally between the plates 39 and 40 to extend perpendicular of the post 46 and through the jaw 44 of the lever 41. Near the end 51 of the bar 49, a clamp 52 is connected therearound, the clamp in turn having a spring 53 connected thereinto; the other end of the spring 54 being connected into a plate 55 which is welded to the same side of the frame 23 as the bracket 35 to extend inwardly of the frame, and so that the flat surface of the plate 55 extends in a horizontal plane.

A structure is shown to disclose one means by which a sprocket may normally rotate upon a sleeve or bearing means on the dolly frame until a clutch may be actuated to frictionally engage such sprocket to discontinue the rotation.

Figure 5:
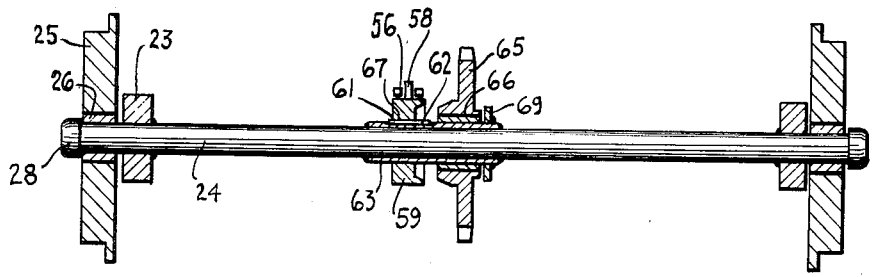
Fig. 5 is a sectional elevation taken along line 5—5 of Fig. 3.
Figure 6:
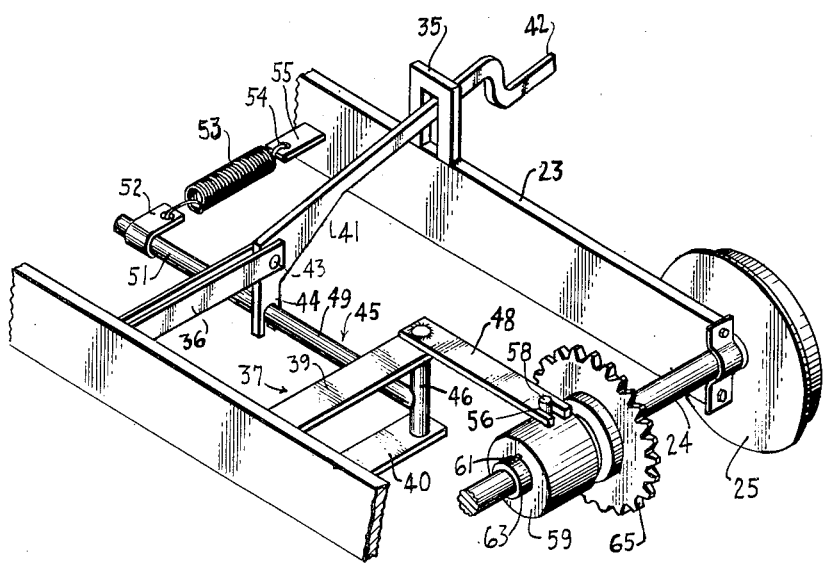
Fig. 6 is a perspective view showing the operation of the dolly clutch mechanism.
Figure 7:
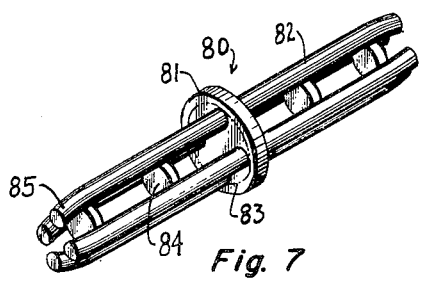
Fig. 7 is a perspective view of the plug employed in maintaining connection between pipe sections.

The arm 48 has the jaw 56 at the end thereof to receive the pin 58 which is rigidly connected to the clutch 59, and which extends vertically upwardly therefrom. The clutch 59 has a keyway 67 therein to slide on the key 61 which is positioned in the key-way 62 in the sleeve 63 fixed to the axle 24 as by welding or the like. The sprocket 65 has the bushing 66 pressed therein and this bushing turns freely about the sleeve 63 fixed to the axle which in turn is fixed to the frame. The sprocket 65 is located against lateral movement on the sleeve 63 by means of the stop plate 69 on one side thereof, and by means of the key 61 on the other side thereof. The axle, being fixed with the frame, is nonrotatable, or is a dead axle, and the sleeve 63 is fixed to the axle and is also dead. Thus the sliding clutch 59, keyed to the dead sleeve 63, is nonrotatable, and when shifted to the right, as viewed in Fig. 5, into engagement with the rotatably mounted sprocket 65, locks the sprocket to the frame. So long as the sprocket idles or is free to rotate, no pull is transmitted from the traveling conveyor chain 18 to the dolly, but the lockup of the chain engaging sprocket results in the dolly being carried along with the chain.

When it is desired to engage the clutch 59 with the sprocket 65 to prevent it from turning around the sleeve 63, the handle 42 of the lever 41 is pushed downwardly so that the jaw 44 is moved in a direction away from the bracket 35. This moves the bar 49 in the same direction as the jaw 44 with result that the post 46 pivots in the plates 39 and 4 to move the arm 48 toward the bracket 35. As the jaw 56 of the arm 48 is in engagement with the pin 58 of the clutch 59, this results in the clutch 59 being moved into engagement with the sprocket 65 to restrain it from rotation.

It can thus be seen that the spring 54 tends to hold the clutch 59 disengaged from the sprocket 65 and tends to aid the operation of disengaging the clutch when the handle 42 is manually raised upwardly.

A cam lug or plate 70 is mounted on the track 12 at a point spaced from the machine 4 a distance corresponding to a distance at which it may be desired to stop a pipe conveyed from the machine for unloading purposes. A similar cam lug or plate 71 is mounted on the upper track 12 to extend therebelow and the location of this cam lug from the conveyor end upright 7 is determined by the length of the space or area in which the dollies are to be stored as will be hereinafter described.

In operation, the alternately spaced dollies 21 and 22 are located on the lower track 11 and in the space or area 72 between the cam lug 71 and the end upright 7, with the clutch of each dolly initially disengaged from the sprockets. The first dolly in the sequence is a dolly 21 which is located in the storage area nearest the upright 7.

The prime mover 73 is then started which drives the chain 68 by means of a conventional sprocket arrangement, not shown, which is mounted on the conveyor end 20 to drive the chain 18. The handle 42 of the first dolly 21 is then pushed down to engage the clutch 59 thereof with its sprocket 65 with the result that the moving chain 18 pulls the non-rotating sprocket 65 along therewith so that the dolly passes up through the arcuate space inwardly of the plate 9 into a position on the upper track 12; the wheels 25 of the dolly riding in such passage on the plate segments 9 which extend around the conveyor end 19 from the lower track 11 to a point above the upper track 12. This takes place just as the pipe 75, which is being processed by the machine 4, has moved horizontally over the horizontal plate 76 of the upright 7 to extend over the conveyor therebeyond. The under side of the forward end of the pipe 75 first comes to rest in engagement with the band 31 and then the band 32, two such bands being provided on the dolly 21 to prevent the dolly from tipping as the forward band 31 first enters into engagement with the pipe.

With the pipe thus in resting engagement with the first dolly 21, the handle 42 of the dolly 21 is pulled upwardly to disengage the clutch 59 from the sprocket 65, so that the sprocket 65 will rotate freely around the axle sleeve 63. The traction of the dolly is now accomplished only by the horizontal motion imparted to the pipe 75 by the machine 4, as the pipe 75 is in frictional engagement with the dolly 21 by means of its contact with the bands 31 and 32 and pushes it along the track 12 by means of such contact.

In order to maintain continuous connection between pipe sections 75, as they move through the machine, plugs 80 are provided for insertion between pipe sections. Each of such plugs has a central cylindrical plate 81 of equal diameter to outer pipe diameter. Rods 82 are located on the plate 81 to extend on each side of the plate and at radial distances from the plate center so that the diameter of a circle 83 passing through the outermost points of the rods 82 is equal to substantially the inner diameter of the pipe being treated. Bracing plates 84 are then rigidly connected to the rods 82 to maintain them in engagement with the inner pipe surface, and the ends 85 of the rods 82 are tapered slightly inwardly so that they may be easily inserted inside the pipe.

These plugs 80 are put into the rear end of a pipe section 75 which is within the machine, and into the forward end of a succeeding section which is yet to enter the machine. Then the forward section 75 moves on through the machine and is wrapped, the wrapping continues thereafter and wraps around the plug 80 and over the forward end of the succeeding pipe section 75. This has happened before the forward end of the first pipe section 75 has reached the point over-lying the conveyor end 19 at which the second dolly 22 is to be positioned to support the pipe. Then the second dolly 22 has its clutch and sprocket placed in engagement so that the chain 18 may move the second dolly up into position to place the band 33 into supporting engagement with the pipe end.

The chain 18 is driven to move the pipe much faster than it is moved through the machine. Consequently, the chain 18, engaged with the non-rotating sprocket 65, will transport the dolly 22 and the pipe 75 supported thereby, along therewith and will result in breaking the wrapping between the pipe end and the plug 80 and will further pull the forward pipe section 75 out of engagement with the rods 82 of the plug 80 and leave the plug in the succeeding pipe section 75 which is passing through the machine. The plug 80 may then be removed from the succeeding pipe section and taken to the rear of the machine 4 for further use in the same manner as hereinabove described.

The chain 18 then moves the dollies 21 and 22 and the forward pipe section 75 supported thereby down the conveyor until the handle 42 of the second dolly 22 comes into contact with the surface 86 of the cam lug 70 and is raised thereby to disengage the clutch 59 from the sprocket 65. When this occurs both the sprocket 65 of the rear dolly 22 and the sprocket 65 of the forward dolly 21 each simply revolve freely about the axle sleeve 63 of its respective dolly so that there is no further traction for transporting the pipe. This results in stopping the pipe in the desired position for it to be unloaded from the dollies.

After a pipe section 75 has been unloaded, the clutch and sprockets of both the forward and rear dollies which have supported the pipe, are engaged so that the chain 18 transports the dollies downwardly past the end 20 of the conveyor and down the lower track 11 in inverted position until the handles of the sprockets engage the cam surface 89 of the cam lug 71 to move these handles downwardly, as in inverted position, to disengage the sprockets 59 and clutches 65 thereof. As succeeding dollies pass the cam lug 71 and have their sprockets and clutches disengaged, they tend to collect one after the other in the area 72 which can be termed the dolly storage area of the conveyor. Although in theory there should be no motion of the dollies with relation to the chain after these sprockets and clutches have been disengaged, there is in practice some motion that results from the slight frictional traction obtained because of the revolving contact of the sprocket bushing 66 with the axle sleeves 63, and this is sufficient to move the dollies from the cam lug 71 toward the upright 7 at the end of the conveyor so that they tend to congregate in the space or area adjacent the upright 7.

It is also pointed out that this invention is not limited to the construction feature whereby the clutch 59 and sprocket 65 on each dolly is located on the rear axle 24 thereof, but the sprocket and clutch may also be located on the front axle as well.

It is herein pointed out that this invention is not limited to a conveyor system adapted to transfer pipe sections which have been connected during processing by a machine as hereinabove described, but it is also adapted to transfer horizontally moving objects which may be transferred to the conveyor system at spaced intervals. In this case, the rear dolly 22 is placed in position on the track 12 to support the rear position of a pipe section 75 just before the rear end thereof leaves its support in the machine 4 or in the device or conveyance from which it is to be received. In this case, the band 33 of the dolly 22 will receive the pipe or object at some distance from the rear end thereof, this distance being determined by the location of the last point of support of the machine 4 from the conveyor 1.

Broadly this invention considers a conveyor system which is partially automatic and partially manually operative and which is calculated to receive and move horizontally moving objects, as pipe, from a processing machine, from such machine to some unloading point which is located at a distance therefrom.

What is claimed is:
1. A conveyor system comprising, a frame, uprights thereon, a pair of tracks supported by said uprights and vertically spaced from each other, an endless chain mounted to extend parallel with said upper track and suspended above said lower track, means to drive said chain, dollies for passage along said tracks in engagement with said chain, each dolly including a wheeled axle, a sleeve fixed to said frame, a sprocket freely rotatable on said sleeve, a clutch slidably keyed to said sleeve, and operating means on said dolly for engaging said clutch with said sprocket to prevent its rotation about said sleeve so that said chain may move said dolly and to disengage said clutch from said sprocket, arcuate track segments on said lower track and extending around said upper track ends so that said dollies may be transferred from track to track by said chain, clutch trip lugs on said upper and lower track, each operating means being set manually to engage said clutch and said sprocket for movement of said dolly by said chain and being operable upon contact with either lug to disengage said clutch and sprocket to discontinue said movement.

2. A conveyor system comprising, a frame, uprights thereon, a pair of tracks supported by said uprights and vertically spaced from each other, an endless chain mounted to extend parallel with said upper track and suspended above said lower track, means to drive said chain, dollies for passage along said tracks in engagement with said chain, each dolly including a wheeled axle, a sleeve fixed to said frame, a sprocket freely rotatable on said sleeve, a clutch slidably keyed to said sleeve, and operating means on said dolly for engaging said clutch with said sprocket to prevent its rotation about said sleeve so that said chain may move said dolly and to disengage said clutch from said sprocket, arcuate track segments on said lower track and extending around said upper track ends so that said dollies may be transferred from track to track by said chain, and clutch trip lugs on said upper and lower track.

References Cited in the file of this patent

UNITED STATES PATENTS

| Number | Name | Date |
| --- | --- | --- |
| Re. 10,602 | Rasmusen | May 26, 1885 |
| 286,044 | McCall et al. | Oct. 2, 1883 |
| 621,011 | Wright | Mar. 14, 1899 |
| 825,226 | Linden | July 3, 1906 |
| 1,501,996 | Grooms | July 22, 1924 |
| 1,615,027 | Meyer | June 18, 1927 |
| 1,657,206 | Evans | June 24, 1928 |
| 1,883,964 | Kramer | Oct. 25, 1932 |
| 2,166,608 | Postlewaite | July 18, 1939 |
| 2,166,609 | Putnam | July 18, 1939 |
| 2,192,484 | Bryan | Mar. 5, 1940 |
| 2,279,340 | Postlewaite | Apr. 14, 1942 |
| 2,349,624 | Higgins | May 23, 1944 |
| 2,472,530 | Harrison | June 7, 1949 |
| 2,540,378 | Restetsky | Feb. 6, 1951 |

FOREIGN PATENTS

| Number | Country | Date |
| --- | --- | --- |
| 505,026 | Germany | Aug. 15, 1930 |